United States Patent
Melby et al.

(10) Patent No.: US 7,147,366 B2
(45) Date of Patent: Dec. 12, 2006

(54) METHOD AND APPARATUS FOR ASSESSING THE RATIONALITY OF A TRANSMISSION FLUID TEMPERATURE MEASURE

(75) Inventors: Steve L. Melby, Howell, MI (US); Kenneth M. Simpson, Swartz Creek, MI (US)

(73) Assignee: Delphi Technologies, Inc., Troy, MI (US)

( * ) Notice: Subject to any disclaimer, the term of this patent is extended or adjusted under 35 U.S.C. 154(b) by 91 days.

(21) Appl. No.: 10/941,061

(22) Filed: Sep. 14, 2004

(65) Prior Publication Data

US 2006/0056481 A1 Mar. 16, 2006

(51) Int. Cl.
*G01K 15/00* (2006.01)
*G01C 25/00* (2006.01)

(52) U.S. Cl. .......................... 374/1; 374/144; 702/116; 701/34

(58) Field of Classification Search ................ 374/144, 374/145
See application file for complete search history.

(56) References Cited

U.S. PATENT DOCUMENTS 4,136,329 A * 1/1979 Trobert ....................... 340/459
5,107,246 A * 4/1992 Mogaki ....................... 340/449
5,556,349 A * 9/1996 Ishii et al. .................... 477/76
5,848,381 A * 12/1998 Ishii et al. .................... 702/99
5,995,887 A * 11/1999 Hathaway et al. ............ 701/34
6,259,981 B1 * 7/2001 Wilcosky ..................... 701/29
2005/0178130 A1 * 8/2005 Van Gilder et al. .......... 62/129

FOREIGN PATENT DOCUMENTS

| JP | 62177356 A | * | 8/1987 |
| JP | 03225032 A | * | 10/1991 |
| JP | 03244868 A | * | 10/1991 |
| JP | 03260463 A | * | 11/1991 |
| JP | 07301315 A | * | 11/1995 |
| KR | 2003040600 A | * | 5/2003 |
| KR | 2004034268 A | * | 4/2004 |

* cited by examiner

*Primary Examiner*—Gail Verbitsky
*Assistant Examiner*—Mirellys Jagan
(74) *Attorney, Agent, or Firm*—Paul L. Marshall

(57) ABSTRACT

The rationality of a measured temperature of transmission fluid is assessed by comparing it to an engine coolant temperature. The rationality assessment is enabled when the ambient air temperature is reliably determined and deemed normal, a sufficient soak condition is confirmed, and the measured temperature, the engine temperature and the ambient air temperature are all within prescribed ranges. The rationality assessment monitors the ambient temperature relative to the initial engine temperature during the assessment period, and the assessment is disabled if the ambient air temperature deviates from the initial engine temperature by more than a calibrated value.

20 Claims, 5 Drawing Sheets

METHOD AND APPARATUS FOR ASSESSING THE RATIONALITY OF A TRANSMISSION FLUID TEMPERATURE MEASURE

TECHNICAL FIELD

The present invention relates to assessing the rationality of a measured parameter in a motor vehicle powertrain control system, and more particularly to a method and apparatus for assessing the rationality of a transmission fluid temperature measure.

BACKGROUND OF THE INVENTION

Various measured and estimated parameters utilized in the control of a motor vehicle powertrain must be assessed for rationality because erroneous parameter values can lead to degraded emission control, fuel economy and performance. One such parameter is the fluid temperature of a fluidic automatic transmission since the transmission shift points are scheduled as a function of the fluid temperature. Additionally, the transmission fluid temperature can be used as an enabling criterion for assessing the rationality of other transmission parameters. Accordingly, there is a need for reliably assessing the rationality of the measured transmission fluid temperature.

Ordinarily, the rationality of a measured fluid temperature can be assessed simply by monitoring the measured temperature for characteristic changes in value as the powertrain warms up. However, such techniques are not adequate to reliably assess the transmission fluid temperature because certain operating conditions can result in a false indication of non-rationality. For example, the engine may be subject to external heating by an engine block heater, or the vehicle may be garaged for a prolonged period at one ambient temperature and then driven into a very different ambient temperature. Accordingly, what is needed is a way of reliably assessing the rationality of a transmission fluid temperature measure under various operating conditions.

SUMMARY OF THE INVENTION

The present invention is directed to an improved method and apparatus for assessing the rationality of a measured temperature of transmission fluid wherein the measured temperature is compared to an engine coolant temperature. The rationality assessment is enabled when the ambient air temperature is reliably determined and deemed normal, a sufficient soak condition is confirmed, and the measured temperature, the engine temperature and the ambient air temperature are all within prescribed ranges. The ambient temperature is compared to the initial engine temperature during the assessment period, and the assessment is disabled if the ambient air temperature deviates from the initial engine temperature by more than a calibrated value.

DESCRIPTION OF THE PREFERRED EMBODIMENT

Although the present invention is disclosed herein in the context of a motor vehicle powertrain including a conventional multi-speed ratio fluidic transmission, the invention is also applicable to other types of transmissions, including continuously variable transmissions, electrically variable transmissions, and so on. Moreover, the invention is not necessarily limited to motor vehicle powertrains.

Figure 1:
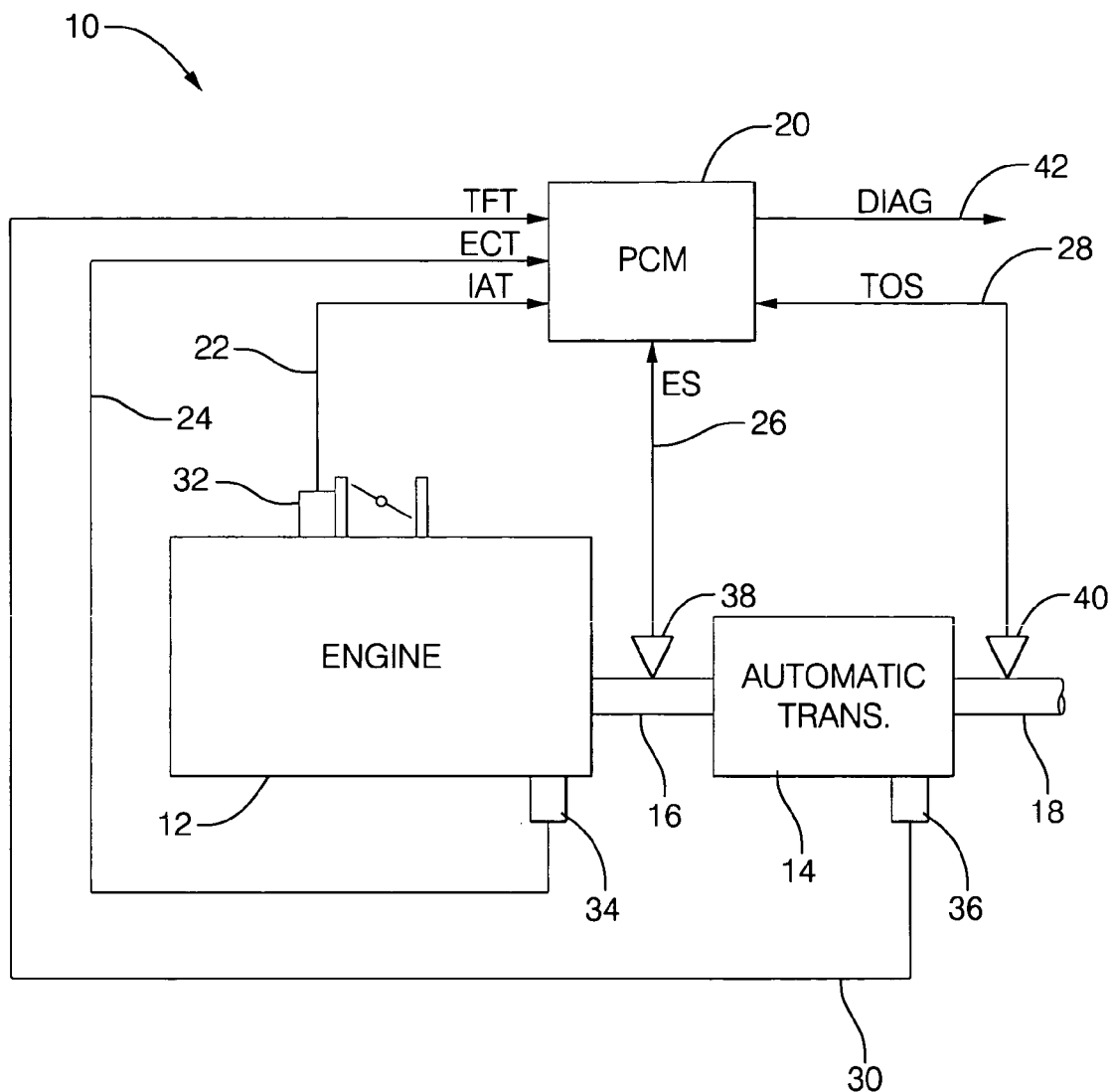
FIG. 1 is a block diagram of a motor vehicle powertrain including a microprocessor-based powertrain control module (PCM) for carrying out a transmission fluid temperature diagnostic according to this invention.

Referring to FIG. 1, the reference numeral 10 generally designates a motor vehicle powertrain, including an internal combustion engine 12 and a fluidic automatic transmission 14 having an input coupled to the engine output shaft 16 and an output coupled to a drive shaft 18. A microprocessor-based powertrain control module (PCM 20) controls the operation engine 12 and transmission 14 based on various predetermined and measured input parameters, including the ambient, or inlet air temperature (IAT) on line 22, the engine coolant temperature (ECT) on line 24, the engine speed (ES) on line 26, the transmission output speed (TOS) on line 28 and the transmission fluid temperature (TFT) on line 30. The IAT, ECT and TFT parameters are measured with suitably located temperature sensors 32, 34, 36, and the ES and TOS parameters are measured with suitably located speed sensors 38, 40. In addition to providing control outputs (not shown) for engine 12 and transmission 14, PCM 20 performs various diagnostic routines for assessing the rationality of certain measured parameters, including the TFT signal on line 30, because a sensor failure could lead to degraded engine emission control, fuel economy and performance. For example, the rationality of the TFT parameter is assessed because it is used to schedule transmission shift points, and as an enabling criterion for assessing the rationality of other transmission parameters. In any event, PCM 20 reports the results of the diagnostic routines on the diagnostic (DIAG) output line 42. In a typical implementation, the output line 42 is used to activate a "check engine" lamp, and to transfer the reported diagnostic results to a service tool attached to a communications port by a service technician to facilitate any needed repairs.

FIGS. 2–5 together depict a software diagnostic routine that is periodically executed by the PCM 20 for assessing the rationality of the measured TFT parameter on line 30 and reporting any detected anomalies on diagnostic output line 42. The routine utilizes a number of bookkeeping flags, including the TFT_DIAG_COMPL and AVG_IAT flags, which are initialized to FALSE at each engine key-on. In general, the routine includes a first portion depicted in FIGS. 2–3 for determining if enabling conditions for the diagnostic assessment have been met, and a second portion depicted in FIGS. 4–5 for carrying out the diagnostic assessment and reporting any detected anomalies. The connector blocks 76, 106, 120 and 142 couple flow lines from one figure to another.

Figure 2:
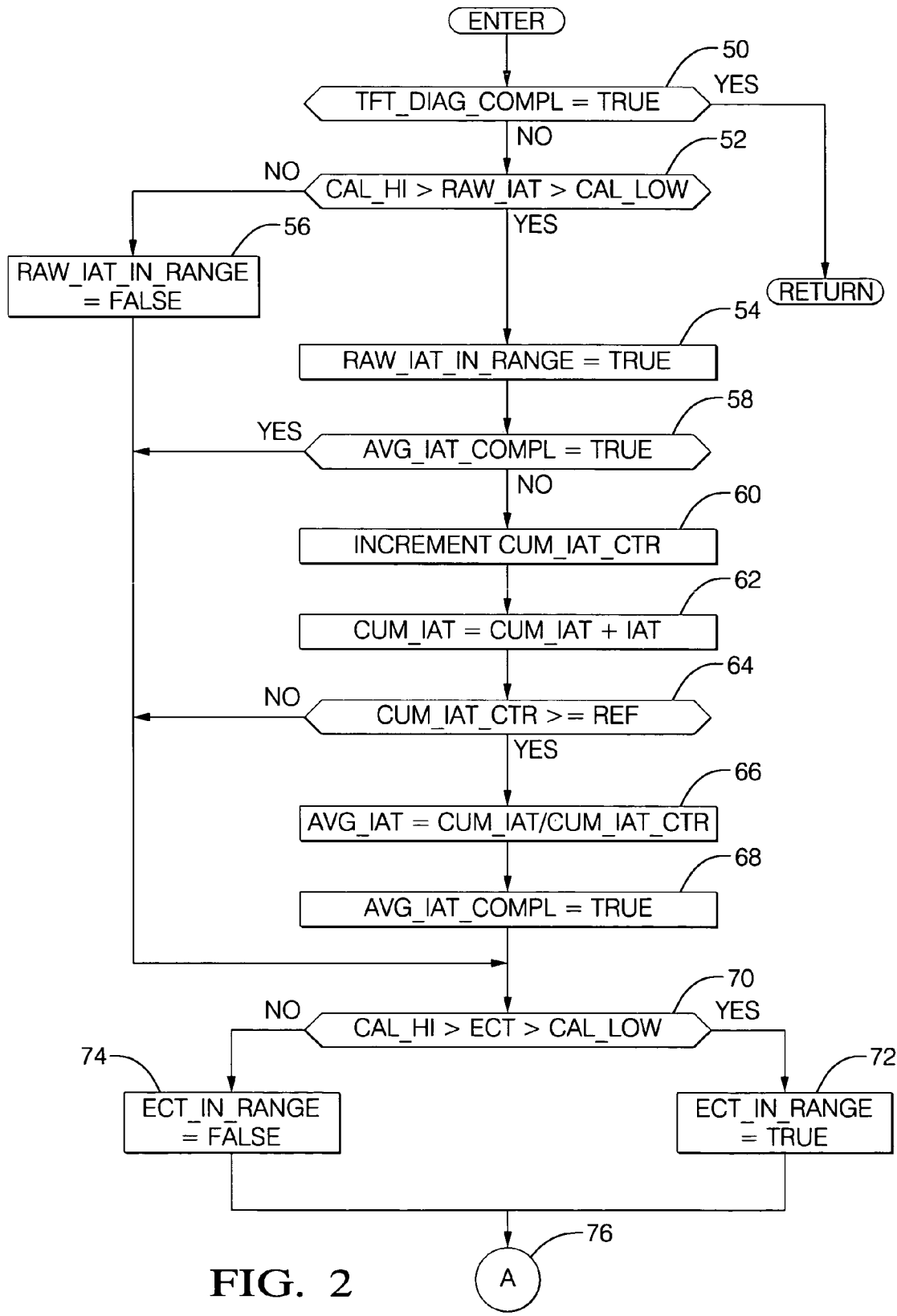
FIGS. 2–5 depict a flow diagram representative of a software routine executed by the ECM of FIG. 1 for carrying out the diagnostic method of this invention. The flow diagram portion depicted in FIGS. 2 and 3 determines if enabling conditions for the diagnostic have been met, and the flow diagram portion depicted in FIGS. 4 and 5 assesses the rationality of a transmission fluid temperature measure.
Figure 3:
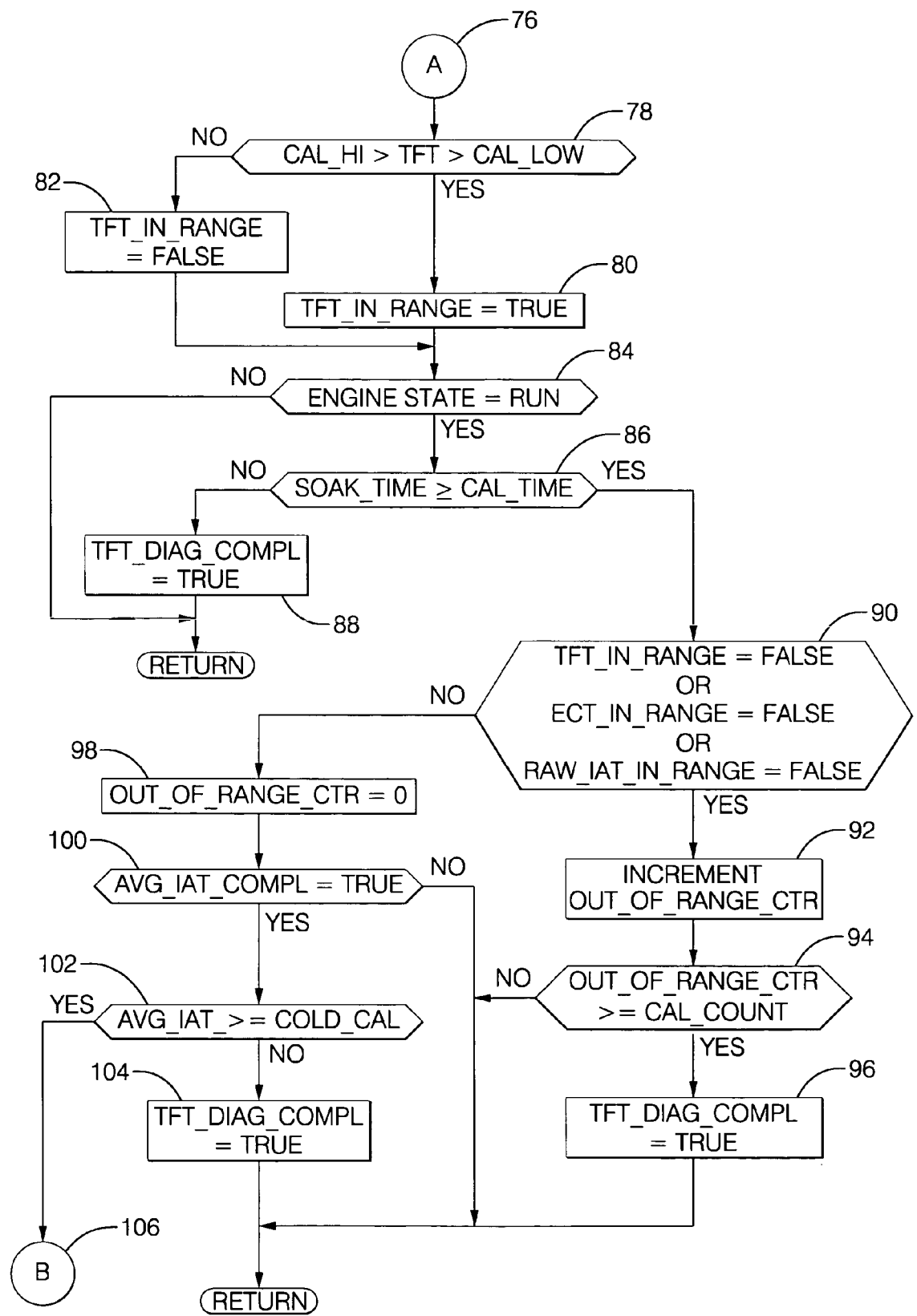

Referring to FIGS. 2–3, the block 50 is executed to determine if the state of the TFT_DIAG_COMPL flag is TRUE. Since the flag is initialized to FALSE at engine key-on, the block 52 is then executed to determine if the raw (i.e., un-averaged) value (RAW_IAT) of the IAT parameter is within a specified range defined by the calibrated temperature values CAL_HI and CAL_LO. If so, the block 54 sets a RAW_IAT_IN_RANGE flag to TRUE; if not, the block 56 sets the flag to FALSE.

If RAW_IAT is within the range specified by block 52, the blocks 58–68 are executed to accumulate and average a number (REF) of IAT values, forming AVT_IAT. The block 58 determines if the state of the AVG_IAT_COMPL flag is TRUE. Since the flag is initialized to FALSE at engine key-on, the blocks 60 and 62 are then executed to increment a counter CUM_IAT_CTR and to accumulate successive samples of IAT in a parameter CUM_IAT, initialized to zero at engine key-on. When the counter CUM_IAT_CTR has been incremented to the reference number REF, the block 64 is answered in the affirmative, and the blocks 66 and 68 are executed to calculate the average AVG_IAT and to set the AVG_IAT_COMPL flag to TRUE. Thereafter, the block 58 will be answered in the affirmative, and the blocks 60–68 will be skipped, as indicated.

The block 70 determines if the ECT parameter is within a specified range defined by the calibrated temperature values CAL_HI and CAL_LO, which not necessarily the same as the similarly named calibration values set forth in block 52. If so, the block 72 sets an ECT_IN_RANGE flag to TRUE; if not, the block 74 sets the flag to FALSE. Similarly, the block 78 determines if the TFT parameter is within a specified range defined by the calibrated temperature values CAL_HI and CAL_LO, which not necessarily the same as the similarly named calibration values set forth in blocks 52 and 70. If so, the block 80 sets a TFT_IN_RANGE flag to TRUE; if not, the block 82 sets the flag to FALSE.

The blocks 84 and 86 are then executed to determine if the engine 12 is running, and if the time (SOAK_TIME) since the previous engine run condition is at least a calibrated time (CAL_TIME) such as two hours. If the ENGINE STATE is not RUN, the routine is exited. If SOAK_TIME is less than CAL_TIME, the TFT parameter cannot be reliably assessed by the routine, and block 88 sets the TFT_DIAG_COMPL flag to TRUE prior to exiting the routine. Setting the TFT_DIAG_COMPL flag to TRUE ensures that block 50 will thereafter be answered in the affirmative, preventing further execution of the routine during the current engine key cycle.

If blocks 84 and 86 are both answered in the affirmative, the block 90 is executed to determine if the TFT, ECT and IAT parameters are all in range, as indicated by the state of the respective "IN_RANGE" flags. If one or more of the parameters is out of range, block 90 is answered in the affirmative, and the blocks 92, 94 and 96 are executed to set the TFT_DIAG_COMPL flag to TRUE if the condition continuously prevails for at least a predetermined time. The block 92 increments a counter OUT_OF_RANGE_CTR, initialized to zero at engine key-on, the block 94 compares the counter to a calibrated count CAL_COUNT, and the block 96 sets the TFT_DIAG_COMPL flag to TRUE if and when the counter reaches or exceeds CAL_COUNT. As mentioned above in respect to block 88, setting the TFT_DIAG_COMPL flag to TRUE ensures that block 50 will thereafter be answered in the affirmative, preventing further execution of the routine during the current engine key cycle. If the TFT, ECT and IAT parameters are all in range, the block 98 resets OUT_OF_RANGE_CTR to zero, and the block 100 determines if the AVG_IAT calculation has been completed, as indicated by the status of the AVG_IAT_COMPL flag. If block 100 is answered in the affirmative, the block 102 compares AVG_IAT to a calibrated temperature COLD_CAL indicative of an extremely cold ambient condition, such as −10° C. If AVG_IAT is below COLD_CAL, the TFT parameter cannot be reliably assessed by the routine, and block 104 sets the TFT_DIAG_COMPL flag to TRUE prior to exiting the routine, preventing further execution of the routine during the current engine key cycle. On the other hand, if AVG_IAT is at least as high as COLD_CAL, the diagnostic routine for the TFT parameter is enabled, and PCM 20 passes on to the routine portion of FIGS. 4–5, as designated by the flow connector 106.

Figure 4:
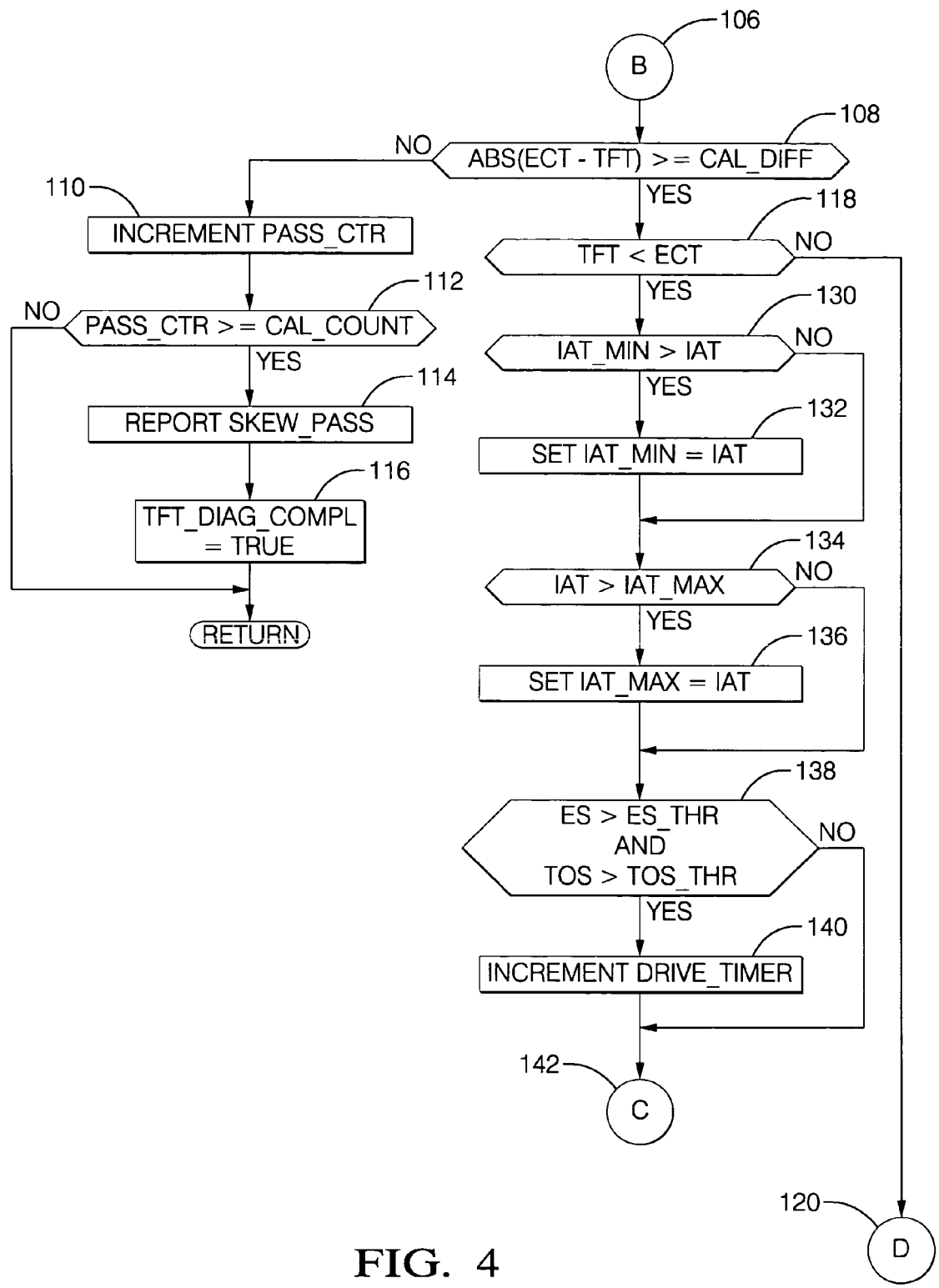
Figure 5:
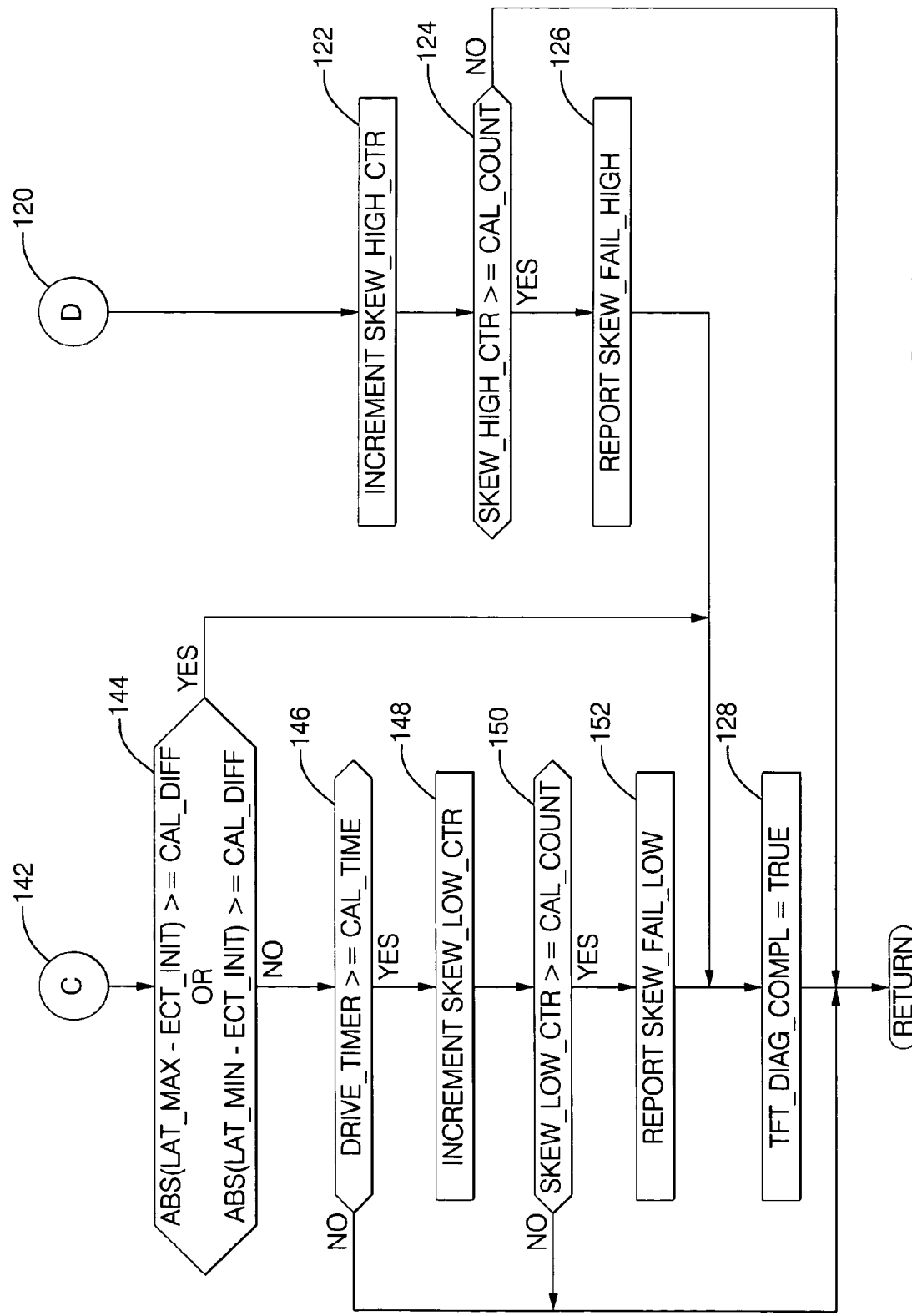

Referring to FIGS. 4–5, the block 108 is executed to determine if TFT is within CAL_DIFF degrees of ECT, where CAL_DIFF may have a value such as 5° C. If ABS(ECT−TFT) is less than CAL_DIFF, the TFT parameter is considered to be rational, and the blocks 110–116 are executed to report a pass condition for the parameter if the condition prevails for at least a predetermined time. The block 110 increments a pass counter PASS_CTR, initialized to zero at engine key-on, the block 112 compares the counter to a calibrated count CAL_COUNT, and the blocks 114 and 116 report the diagnostic outcome and set the TFT_DIAG_COMPL flag to TRUE if and when the counter reaches or exceeds CAL_COUNT. As mentioned above, setting the TFT_DIAG_COMPL flag to TRUE ensures that block 50 will thereafter be answered in the affirmative, preventing further execution of the routine during the current engine key cycle.

If TFT is not within CAL_DIFF degrees of ECT, the block 118 is executed to determine if TFT is skewed high or low with respect to ECT. If TFT is higher than ECT, block 118 will be answered in the negative, and PCM 20 passes to the blocks 122–126 of FIG. 5, as indicted by the flow connector 120. The blocks 122–128 serve to report a skew-high failure of the TFT parameter if the condition prevails for at least a predetermined time. The block 122 increments a counter SKEW_HIGH_CTR, initialized to zero at engine key-on, the block 124 compares the counter to a calibrated count CAL_COUNT, and the blocks 126 and 128 report the diagnostic outcome (SKEW_FAIL_HIGH) and set the TFT_DIAG_COMPL flag to TRUE if and when the counter reaches or exceeds CAL_COUNT. As mentioned above, setting the TFT_DIAG_COMPL flag to TRUE ensures that block 50 will thereafter be answered in the affirmative, preventing further execution of the routine during the current engine key cycle.

Returning to FIG. 4, if TFT is lower than ECT, block 118 will be answered in the affirmative. In this case, the remainder of the routine is executed to determine if the apparent skew-low condition of the TFT parameter is reliable. First, the blocks 130–136 are executed to identify the minimum and maximum values of IAT during the diagnostic assessment period. The blocks 130 and 132 save the minimum IAT value in the variable IAT_MIN, initialized to a maximum value at engine key-on; and the blocks 134 and 136 save the maximum IAT value in the variable IAT_MAX, initialized to a minimum value at engine key-on. The blocks 138 and 140 then increment an engine driving timer DRIVE_TIMER if the engine and transmission output speeds ES and TOS exceed respective threshold values ES_THR and TOS_THR. In this way, DRIVE_TIMER will not be incremented during engine idle conditions.

The block 144 of FIG. 5 is then executed to compare the maximum and minimum IAT values identified at blocks 132 and 136 with the engine coolant temperature at engine start-up, designated herein as ECT_INIT. If IAT_MAX or IAT_MIN are not within CAL_DIFF degrees of ECT_INIT (where CAL_DIFF may have a value such as 10° C.), block 144 is answered in the affirmative. This can occur immediately if the engine 12 is externally heated with an engine block heater, making ECT_INIT significantly higher than IAT. It can also occur sometime during the initial driving period (defined by DRIVE_TIMER and SKEW_LOW_CTR) if the vehicle is garaged at one temperature, and then driven into an environment having a significantly higher or lower temperature. In such cases, it is difficult to reliably assess the rationality of the TFT parameter because the ECT and TFT parameters will increase at different rates, and block 128 is executed to set the TFT_DIAG_COMPL flag to TRUE, preventing further execution of the routine during the current engine key cycle. If block 144 is answered in the negative, and it is determined at block 146 that the DRIVE_TIMER has been incremented to at least CAL_TIME (which may correspond to an elapsed time such as 5 minutes), the blocks 148–152 and 128 are executed to report a skew-low failure of the TFT parameter if the condition prevails for at least a predetermined time. The block 148 increments a counter SKEW_LOW_CTR, initialized to zero at engine key-on, the block 150 compares the counter to a calibrated count CAL_COUNT, and the blocks 152 and 128 report the diagnostic outcome (SKEW_FAIL_LOW) and set the TFT_DIAG_COMPL flag to TRUE if and when the counter reaches or exceeds CAL_COUNT. As mentioned above, setting the TFT_DIAG_COMPL flag to TRUE ensures that block 50 will thereafter be answered in the affirmative, preventing further execution of the routine during the current engine key cycle.

In summary, the method of the present invention assesses the rationality of the TFT parameter primarily by comparing it to the ECT parameter, which may be separately and previously assessed for rationality. The TFT rationality assessment is enabled when the ambient air temperature (as judged by the IAT parameter) is reliably determined and deemed normal, a sufficient soak condition is confirmed, and the TFT, ECT and IAT parameters are all within prescribed ranges. The ambient temperature is compared to the initial engine temperature during the assessment period, and the assessment is disabled if the ambient air temperature deviates from the initial engine temperature by more than a calibrated value.

While the method of the present invention has been described with respect to the illustrated embodiment, it is recognized that numerous modifications and variations in addition to those mentioned herein will occur to those skilled in the art. For example, the various calibrated times and temperatures mentioned herein are exemplary only, and so on. Accordingly, it is intended that the invention not be limited to the disclosed embodiment, but that it have the full scope permitted by the language of the following claims.

The invention claimed is:

1. A method of assessing rationality of a measured temperature of fluid in a transmission, where the transmission is coupled to an engine, comprising the steps of:
   obtaining a temperature of the engine;
   assessing that said measured temperature is rational if said measured temperature is within a calibrated value of the temperature of the engine for at least a predetermined time interval; and
   assessing that said measured temperature is skewed high if said measured temperature exceeds the temperature of the engine by at least said calibrated value for at least a predetermined time interval.

2. The method of claim 1, including the step of:
   disabling the assessing of said measured temperature if said measured temperature or the temperature of said engine are not within respective prescribed temperature ranges.

3. The method of claim 1, including the steps of:
   obtaining a temperature of ambient air; and
   disabling the assessing of said measured temperature if said measured temperature or the temperature of said engine or the temperature of ambient air are not within respective prescribed temperature ranges.

4. The method of claim 1, including the steps of:
   obtaining a temperature of ambient air;
   computing an average ambient air temperature by averaging a prescribed number of samples of the temperature of ambient air; and
   disabling the assessing of said measured temperature if said average air temperature is below a temperature threshold indicative of extremely cold ambient air.

5. The method of claim 1, including the steps of:
   obtaining a temperature of ambient air and an initial temperature of the engine;
   detecting a first condition for which said measured temperature is lower than the temperature of the engine by at least said calibrated value, and a second condition for which speeds of the engine and transmission exceed respective threshold values; and
   when said first and second conditions are detected, assessing whether said measured temperature is skewed low based on elapsed time, the temperature of ambient air and the initial temperature of the engine.

6. The method of claim 5, including the step of:
   disabling the assessing of whether said measured temperature is skewed low if the temperature of said ambient air is not within a calibrated value of the initial temperature of the engine.

7. The method of claim 6, including the steps of:
   identifying minimum and maximum values of the temperature of ambient air; and
   disabling the assessing of whether said measured temperature is skewed low if the identified minimum or maximum values are not within a calibrated value of the initial temperature of the engine.

8. The method of claim 1, including the steps of:
   detecting a first condition for which said measured temperature is lower than the temperature of the engine by at least said calibrated value, and a second condition for which speeds of the engine and transmission exceed respective threshold values; and
   assessing that said measured temperature is skewed low when said first and second conditions are detected for predetermined time intervals.

9. The method of claim 8, including the steps of:
   obtaining a temperature of ambient air and an initial temperature of the engine;
   disabling the assessing of whether said measured temperature is skewed low if the temperature of said ambient air is not within a calibrated value of the initial temperature of the engine.

10. The method of claim 9, including the steps of:
    identifying minimum and maximum values of the temperature of ambient air; and
    disabling the assessing of whether said measured temperature is skewed low if the identified minimum or maximum values are not within the calibrated value of the initial temperature of the engine.

11. Apparatus for assessing rationality of a measured temperature of fluid in a transmission, where the transmission is coupled to an engine, comprising:
    an engine temperature sensor for sensing a temperature of the engine; and diagnostic means responsive to the measured temperature and the temperature of the engine for:

assessing that said measured temperature is rational if said measured temperature is within a calibrated value of the temperature of the engine for at least a predetermined time interval; and assessing that said measured temperature is skewed high if said measured temperature exceeds the temperature of the engine by at least said calibrated value for at least a predetermined time interval.

12. The apparatus of claim 11, where said diagnostic means disables the assessing of said measured temperature if said measured temperature or the temperature of said engine are not within respective prescribed temperature ranges.

13. The apparatus of claim 11, further comprising:

an air temperature sensor for sensing a temperature of ambient air, where said diagnostic means disables the assessing of said measured temperature if said measured temperature or the temperature of said engine or the temperature of ambient air are not within respective prescribed temperature ranges.

14. The apparatus of claim 11, further comprising:

an air temperature sensor for sensing a temperature of ambient air, where said diagnostic means computes an average ambient air temperature by averaging a prescribed number of samples of the temperature of ambient air and disables the assessing of said measured temperature if said average air temperature is below a temperature threshold indicative of extremely cold ambient air.

15. The apparatus of claim 11, further comprising:

an air temperature sensor for sensing a temperature of ambient air, where said diagnostic means obtains an initial temperature of the engine, detects a first condition for which said measured temperature is lower than the temperature of the engine by at least said calibrated value, and a second condition for which speeds of the engine and transmission exceed respective threshold values, and assesses when said first and second conditions are detected whether said measured temperature is skewed low based on elapsed time, the temperature of ambient air and the initial temperature of the engine.

16. The apparatus of claim 15, where said diagnostic means disables the assessing of whether said measured temperature is skewed low if the temperature of said ambient air is not within a calibrated value of the initial temperature of the engine.

17. The apparatus of claim 16, where said diagnostic means identifies minimum and maximum values of the temperature of ambient air, and disables the assessing of whether said measured temperature is skewed low if the identified minimum or maximum values are not within a calibrated value of the initial temperature of the engine.

18. The apparatus of claim 11, where said diagnostic means detects a first condition for which said measured temperature is lower than the temperature of the engine by at least said calibrated value, and a second condition for which speeds of the engine and transmission exceed respective threshold values, and assesses that said measured temperature is skewed low when said first and second conditions are detected for predetermined time intervals.

19. The apparatus of claim 18, further comprising:

an air temperature sensor for sensing a temperature of ambient air, where said diagnostic means obtains an initial temperature of the engine, and disables the assessing of whether said measured temperature is skewed low if the temperature of said ambient air is not within a calibrated value of the initial temperature of the engine.

20. The apparatus of claim 19, where said diagnostic means identifies minimum and maximum values of the temperature of ambient air, and disables the assessing of whether said measured temperature is skewed low if the identified minimum or maximum values are not within the calibrated value of the initial temperature of the engine.

* * * * *